US010816348B2

(12) United States Patent
Bansal et al.

(10) Patent No.: US 10,816,348 B2
(45) Date of Patent: Oct. 27, 2020

(54) MATCHING A FIRST CONNECTED DEVICE WITH A SECOND CONNECTED DEVICE BASED ON VEHICLE-TO-EVERYTHING MESSAGE VARIABLES

(71) Applicant: TOYOTA JIDOSHA KABUSHIKI KAISHA, Toyota-shi, Aichi-ken (JP)

(72) Inventors: Gaurav Bansal, Mountain View, CA (US); Hongsheng Lu, Mountain View, CA (US); John Kenney, Mountain View, CA (US)

(*) Notice: Subject to any disclaimer, the term of this patent is extended or adjusted under 35 U.S.C. 154(b) by 0 days.

(21) Appl. No.: 16/239,739

(22) Filed: Jan. 4, 2019

(65) Prior Publication Data

US 2020/0217673 A1 Jul. 9, 2020

(51) Int. Cl.
G01C 21/34 (2006.01)
H04B 17/318 (2015.01)
H04W 4/44 (2018.01)
H04W 4/029 (2018.01)
H04W 76/40 (2018.01)
H04W 12/04 (2009.01)
G06Q 50/30 (2012.01)

(52) U.S. Cl.
CPC ....... *G01C 21/3438* (2013.01); *H04B 17/318* (2015.01); *H04W 4/029* (2018.02); *H04W 4/44* (2018.02); *H04W 12/04* (2013.01); *H04W 76/40* (2018.02); *G06Q 50/30* (2013.01)

(58) Field of Classification Search
None
See application file for complete search history.

(56) References Cited

U.S. PATENT DOCUMENTS

2006/0276960 A1* 12/2006 Adamczyk ............ G06Q 10/06
701/516
2008/0139217 A1* 6/2008 Alizadeh-Shabdiz .... G01S 5/02
455/456.1

(Continued)

OTHER PUBLICATIONS

EPO, Extended European Search Report for European Patent Application No. 20150037.8, dated Feb. 11, 2020, 8 pages.

(Continued)

*Primary Examiner* — Chico A Foxx
(74) *Attorney, Agent, or Firm* — Burbage Law P.C.; Jon-Michael Burbage; Elizabeth Ruzich

(57) ABSTRACT

The disclosure includes embodiments for matching riders to drivers for a ride sharing service based on a V2X message variable. In some embodiments, a method for a first connected device includes: receiving a first V2X broadcast message from a second connected device, where the first V2X broadcast message includes a request for the ride sharing service; determining a first V2X-message variable associated with the first V2X broadcast message; executing a ride-share matching process to match the first connected device with the second connected device based at least in part on the first V2X-message variable so that a delay of the ride-share matching process is minimized; and responsive to a completion of the ride-share matching process, modifying an operation of the communication unit to establish a secure communication between the first connected device and the second connected device for exchanging ride share information for the ride sharing service.

20 Claims, 7 Drawing Sheets

(56) References Cited

U.S. PATENT DOCUMENTS

| | | | | |
|---|---|---|---|---|
| 2009/0248587 | A1* | 10/2009 | Van Buskirk | G06Q 50/30 705/80 |
| 2012/0041675 | A1* | 2/2012 | Juliver | G06Q 10/08 701/465 |
| 2015/0081362 | A1* | 3/2015 | Chadwick | G06Q 10/06311 705/7.14 |
| 2015/0161554 | A1* | 6/2015 | Sweeney | G06Q 10/063114 705/7.15 |
| 2015/0204684 | A1* | 7/2015 | Rostamian | G01C 21/3438 701/537 |
| 2015/0242772 | A1* | 8/2015 | Backof, II | G06Q 10/0631 705/7.12 |
| 2015/0310510 | A1* | 10/2015 | Kelly | G07B 13/00 705/13 |
| 2016/0027306 | A1* | 1/2016 | Lambert | G08G 1/123 701/117 |
| 2016/0182312 | A1* | 6/2016 | Tang | H04L 67/1093 705/14.73 |
| 2016/0321771 | A1* | 11/2016 | Liu | G07B 15/00 |
| 2016/0364678 | A1* | 12/2016 | Cao | G06Q 50/30 |
| 2016/0364679 | A1* | 12/2016 | Cao | G06Q 10/083 |
| 2016/0364812 | A1* | 12/2016 | Cao | G06Q 50/01 |
| 2016/0364823 | A1* | 12/2016 | Cao | G06Q 50/30 |
| 2017/0109373 | A1* | 4/2017 | Sung | G06N 7/005 |
| 2017/0156119 | A1* | 6/2017 | Neves | H04W 52/283 |
| 2017/0167882 | A1* | 6/2017 | Ulloa Paredes | G01C 21/3446 |
| 2017/0262659 | A1* | 9/2017 | Kuris | H04L 9/0897 |
| 2017/0270447 | A1* | 9/2017 | Borean | H04W 4/023 |
| 2017/0284820 | A1* | 10/2017 | Dryjanski | H04W 4/14 |
| 2018/0039917 | A1* | 2/2018 | Buttolo | G01C 21/3438 |
| 2018/0060778 | A1* | 3/2018 | Guo | G01C 21/3667 |
| 2018/0074490 | A1* | 3/2018 | Park | G07C 5/008 |
| 2018/0089605 | A1* | 3/2018 | Poornachandran | G06Q 10/06393 |
| 2018/0099643 | A1* | 4/2018 | Golsch | B60R 25/245 |
| 2018/0137593 | A1* | 5/2018 | Djuric | G06Q 50/30 |
| 2018/0159935 | A1* | 6/2018 | Cavalcanti | H04W 4/44 |
| 2018/0183650 | A1* | 6/2018 | Zhang | G01S 13/00 |
| 2018/0211228 | A1* | 7/2018 | Narayan | G06Q 10/1093 |
| 2018/0276780 | A1* | 9/2018 | Akande | G06Q 10/1093 |
| 2018/0340790 | A1* | 11/2018 | Kislovskiy | G01C 21/3484 |
| 2018/0341261 | A1* | 11/2018 | Kislovskiy | G01C 21/3438 |
| 2018/0341276 | A1* | 11/2018 | Kislovskiy | G01C 21/3461 |
| 2018/0341887 | A1* | 11/2018 | Kislovskiy | G06Q 10/0635 |
| 2018/0341888 | A1* | 11/2018 | Kislovskiy | G06Q 10/0635 |
| 2018/0341895 | A1* | 11/2018 | Kislovskiy | G06Q 50/30 |
| 2018/0342034 | A1* | 11/2018 | Kislovskiy | G06Q 50/30 |
| 2018/0342035 | A1* | 11/2018 | Sweeney | G06Q 50/30 |
| 2018/0342113 | A1* | 11/2018 | Kislovskiy | G08G 1/09623 |
| 2018/0356239 | A1* | 12/2018 | Marco | G06Q 10/047 |
| 2019/0043121 | A1* | 2/2019 | Barnes | G06Q 50/30 |
| 2019/0146508 | A1* | 5/2019 | Dean | G05D 1/0088 701/26 |
| 2019/0146509 | A1* | 5/2019 | Dean | G01C 21/3492 701/25 |
| 2019/0200228 | A1* | 6/2019 | Adrangi | H04L 63/0823 |
| 2019/0204992 | A1* | 7/2019 | Bowden | G01C 21/3438 |
| 2019/0354903 | A1* | 11/2019 | Seki | G06Q 30/0284 |
| 2019/0360827 | A1* | 11/2019 | Seki | G01C 21/3438 |
| 2019/0364424 | A1* | 11/2019 | Vanderveen | H04W 12/001 |
| 2019/0370922 | A1* | 12/2019 | Asghari | G06Q 50/30 |
| 2020/0033150 | A1* | 1/2020 | Marco | G06Q 10/04 |
| 2020/0160474 | A1* | 5/2020 | Mitra | G01S 3/04 |

OTHER PUBLICATIONS

Zhou, et al., "EZCab: A Cab Booking Application Using Short-Range Wireless Communication," Pervasive Computing and Communications, 2005, pp. 27-38.

Agrawal, et al., "Efficient Taxi and Passenger Searching in Smart City using Distributed Coordination," 21st International Conference on Intelligent Transportation Systems (ITSC), Nov. 4, 2018, pp. 1920-1927.

Sheu, et al., "A Distributed Taxi Hailing Protocol in Vehicular Ad-Hoc Networks," 2006 IEEE 63rd Vehicular Technology Conference, May 1, 2020, pp. 1-5.

* cited by examiner

MATCHING A FIRST CONNECTED DEVICE WITH A SECOND CONNECTED DEVICE BASED ON VEHICLE-TO-EVERYTHING MESSAGE VARIABLES

BACKGROUND

The specification relates to matching a first connected device with a second connected device based on vehicle-to-everything (V2X) message variables.

Ride share applications (e.g., Uber, Lyft, etc.) are becoming increasingly popular. For example, a ride sharing service such as Uber and Lyft provides a smartphone application for riders and drivers to use its service. A rider provides an input to his/her smartphone application indicating that he/she wants a ride. The rider's smartphone provides a wireless message to a cloud server operated by the ride sharing service. This wireless message uniquely identifies the rider and his/her geographic location. The cloud server then matches the rider to a driver based on a multitude of factors.

Existing ride sharing services use a cloud-based approach to match riders and drivers that results in unwanted delays for riders and drivers at busy locations (e.g., airports, sport stadiums, etc.). For example, these existing solutions are inadequate because using the cloud server causes a significant delay in the amount of time that it takes for a rider to be assigned to a particular driver.

These unwanted delays are also the result of the ride sharing service using factors to match riders and drivers which are not configured to minimize delays. For example, the cloud server sometimes assigns riders to drivers who will take a longer time before they are able to pick up the riders or deliver the riders to their desired destinations because the factors used by the cloud server when assigning a rider to a particular driver are not optimized to reduce the amount of time that the rider waits on the driver.

These unwanted delays may cause a safety risk to the rider because the rider may be located in a crime-ridden area or a location with heavy traffic that increases the rider's chances of getting struck by a vehicle.

SUMMARY

Described are embodiments of a V2X matching system that matches rider user devices with driver user devices for a ride sharing service based on V2X messaging so that delays associated with matching riders and drivers are minimized and rider safety is maximized. By comparison, previous solutions use cloud computing and conventional cloud-computing wireless communications to match riders to drivers using factors that are unrelated to minimizing rider and driver wait time, which can result in drivers being in dangerous situations for an excessive amount of time. Specifically, previous solutions resulted in significant delays when attempting to match riders and drivers at busy locations having regular high demand such as airports, sporting events, shopping malls, concerts, etc.

At least one improvement of the V2X matching system described herein over the existing solutions includes that it does not use a server and does not rely on factors that are unrelated to minimizing rider and driver wait time. Instead, the V2X matching system described herein applies an ad-hoc approach that uses V2X messages and V2X message variables such as a Received Signal Strength (RSS) to match riders with whatever driver is nearest to the rider and wants to give the rider a ride to his/her desired destination.

The V2X matching system advantageously saves riders and drivers time because: servers are not needed, and the time used to communicate with a server is eliminated; riders are matched to whichever driver is closest to them (or whichever driver takes the least time to get to them) and wants to provide a ride; riders are matched to drivers based on proximity and not unrelated factors such as whether a driver has not received a ride in some amount of time, as well as other factors unrelated to minimizing rider/driver wait time.

In some embodiments, the V2X matching system described herein uses V2X message variables to match riders and drivers for a ride sharing service. The V2X matching system is installed in an electronic control unit (ECU) of a vehicle. The application of the V2X matching system does not require the use of a cloud server to match riders and drivers. Instead, the V2X matching system uses a V2X message variable such as a Received Signal Strength (RSS) to match a rider to an optimal driver (e.g., a driver closest to the rider) that wants to give the rider a ride.

In some embodiments, the V2X matching system is compatible either a stand-alone ride sharing application or a plug-in or module of an existing ride sharing application.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for a first connected device including: receiving, via a communication unit of the first connected device, a first V2X broadcast message from a second connected device, where the first V2X broadcast message includes a request for a ride sharing service; determining, at the first connected device, a first V2X-message variable associated with the first V2X broadcast message; executing a ride-share matching process to match the first connected device with the second connected device based at least in part on the first V2X-message variable so that a delay of the ride-share matching process is minimized; and responsive to a completion of the ride-share matching process, modifying an operation of the communication unit to establish a secure communication between the first connected device and the second connected device for exchanging ride share information for the ride sharing service. Other embodiments of this aspect include corresponding computer systems, apparatus, and computer programs recorded on one or more computer storage devices, each configured to perform the actions of the methods.

Implementations may include one or more of the following features. The method where executing the ride-share matching process to match the first connected device with the second connected device includes: receiving a set of V2X-message variables that are determined at a set of other connected devices respectively; determining that, compared with the set of other connected devices, the first connected device satisfies a ride-share matching criterion for the second connected device based on the first V2X-message variable and the set of V2X-message variables; and responsive to the first connected device satisfying the ride-share matching criterion for the second connected device, matching the first connected device with the second connected device. The method where compared with the set of other connected devices, the first connected device has a minimal travel time to the second connected device so that the first connected device satisfies the ride-share matching criterion for the second connected device. The method where compared with the set of other connected devices, the first connected device has a minimal distance to the second connected device so that the first connected device satisfies the ride-share matching criterion for the second connected device. The method where: the first V2X-message variable includes a first received signal strength of the first V2X broadcast message that is determined at the first connected device; the set of V2X-message variables includes a set of received signal strengths of the first V2X broadcast message that are determined at the set of other connected devices respectively; and the first received signal strength at the first connected device has a maximal value compared with the set of received signal strengths at the set of other connected devices, so that the first connected device has the minimal distance to the second connected device. The method where executing the ride-share matching process to match the first connected device with the second connected device further includes: responsive to matching the first connected device with the second connected device, transmitting, via the communication unit, a second V2X broadcast message that responds to the request for the ride sharing service; and receiving, via the communication unit, a third V2X broadcast message that indicates that a rider that operates on the second connected device accepts an offer for a ride provided by the first connected device so that the ride-share matching process completes. The method where the second V2X broadcast message indicates an intention of the first connected device to offer the ride to the rider that operates on the second connected device. The method where the second V2X broadcast message includes a trip fare and a make and a model of a vehicle that offers the ride to the rider that operates on the second connected device. The method where the second V2X broadcast message includes an allocated response time for a driver of the first connected device to take action to accept or reject a bid for the ride. The method where prior to receiving the third V2X broadcast message, executing the ride-share matching process to match the first connected device with the second connected device further includes: generating a notification to prompt the driver of the first connected device to accept or reject the bid for the ride within the allocated response time; and responsive to receiving an input indicating that the driver of the first connected device accepts the bid for the ride, transmitting a fourth V2X broadcast message indicating that the driver of the first connected device accepts the bid for the ride. The method where the first V2X broadcast message includes direction data describing a direction of an intended destination of the second connected device and distance data describing a distance of the intended destination. The method where the first V2X broadcast message is received by a plurality of connected devices within a V2X-communication coverage range of the second connected device and the plurality of connected devices includes the first connected device. The method where modifying the operation of the communication unit to establish the secure communication between the first connected device and the second connected device includes: modifying the communication unit to operate in a secure mode so that one or more first V2X messages that are intended to transmit to the second connected device are encrypted at the communication unit before transmission and one or more second V2X messages that are received from the second connected device are decrypted at the communication unit. The method where the ride share information being exchanged includes one or more of: a phone number associated with the first connected device; a phone number associated with the second connected device; a location of an intended destination; a location of the second connected device; a location of the first connected device; a travel route from the first connected device to the second connected device; and an estimated travel time from the first connected device to the second connected device. Implementations of the described techniques may include hardware, a method or process, or computer software on a computer-accessible medium.

One general aspect includes a system for a first connected device, including a processor and a non-transitory memory storing computer code which, when executed by the processor, causes the processor to: receive, via a communication unit of the first connected device, a first V2X broadcast message from a second connected device, where the first V2X broadcast message includes a request for a ride sharing service; determine, at the first connected device, a first V2X-message variable associated with the first V2X broadcast message; execute a ride-share matching process to match the first connected device with the second connected device based at least in part on the first V2X-message variable so that a delay of the ride-share matching process is minimized; and responsive to a completion of the ride-share matching process, modify an operation of the communication unit to establish a secure communication between the first connected device and the second connected device for exchanging ride share information for the ride sharing service. Other embodiments of this aspect include corresponding computer systems, apparatus, and computer programs recorded on one or more computer storage devices, each configured to perform the actions of the methods.

Implementations may include one or more of the following features. The system where the computer code, when executed by the processor, causes the processor to execute the ride-share matching process at least by: receiving a set of V2X-message variables that are determined at a set of other connected devices respectively; determining that, compared with the set of other connected devices, the first connected device satisfies a ride-share matching criterion for the second connected device based on the first V2X-message variable and the set of V2X-message variables; and responsive to the first connected device satisfying the ride-share matching criterion for the second connected device, matching the first connected device with the second connected device. The system where compared with the set of other connected devices, the first connected device has a minimal travel time to the second connected device so that the first connected device satisfies the ride-share matching criterion for the second connected device. The system where compared with the set of other connected devices, the first connected device has a minimal distance to the second connected device so that the first connected device satisfies the ride-share matching criterion for the second connected device. Implementations of the described techniques may include hardware, a method or process, or computer software on a computer-accessible medium.

One general aspect includes a computer program product including a non-transitory memory storing computer-executable code that, when executed by a processor, causes the processor to: receive, via a communication unit of the first connected device, a first V2X broadcast message from a second connected device, where the first V2X broadcast message includes a request for a ride sharing service; determine, at the first connected device, a first V2X-message variable associated with the first V2X broadcast message; execute a ride-share matching process to match the first connected device with the second connected device based at least in part on the first V2X-message variable so that a delay of the ride-share matching process is minimized; and responsive to a completion of the ride-share matching process, modify an operation of the communication unit to establish a secure communication between the first connected device and the second connected device for exchanging ride share information for the ride sharing service. Other embodiments of this aspect include corresponding computer systems, apparatus, and computer programs recorded on one or more computer storage devices, each configured to perform the actions of the methods.

Implementations may include one or more of the following features. The computer program product where the computer-executable code that, when executed by the processor, causes the processor to execute the ride-share matching process at least by: receiving a set of V2X-message variables that are determined at a set of other connected devices respectively; determining that, compared with the set of other connected devices, the first connected device satisfies a ride-share matching criterion for the second connected device based on the first V2X-message variable and the set of V2X-message variables; and responsive to the first connected device satisfying the ride-share matching criterion for the second connected device, matching the first connected device with the second connected device. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
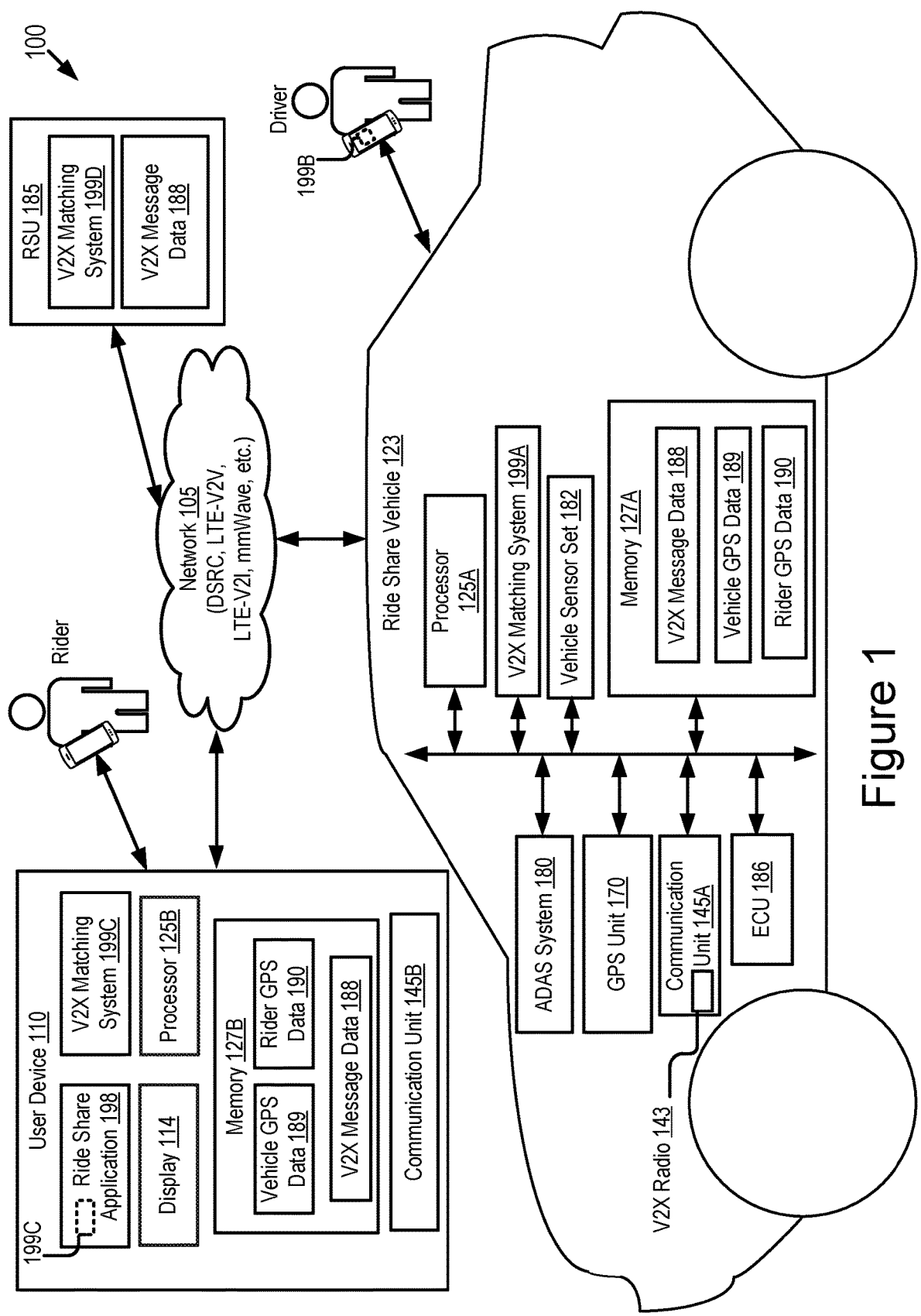
FIG. 1 is a block diagram illustrating an operating environment for a V2X matching system according to some embodiments.

Embodiments of V2X matching systems installed in connected devices are now described. In some embodiments, each connected device is installed with a V2X matching system. Different connected devices can communicate with one another using any form of V2X communications. A connected device can be, for example, any computing device with V2X-communication capability. For example, a connected device is one of a user device (e.g., a smart phone), a connected vehicle (e.g., a ride share vehicle) and a roadside unit (("RSU" if singular, "RSUs" if plural) each having a communication unit.

As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mm-Wave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a V2X message described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

In some embodiments, a connected vehicle that includes the V2X matching system is a DSRC-equipped vehicle. A DSRC-equipped vehicle is a vehicle which: (1) includes a DSRC radio; (2) includes a DSRC-compliant GPS unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. DSRC has a range of substantially 500 meters and is designed to be compatible for wirelessly sending and receiving messages among mobile nodes such as vehicles and RSUs. A DSRC-compliant GPS unit is operable to provide positional information for a vehicle (or some other DSRC-equipped device that includes the DSRC-compliant GPS unit) that has lane-level accuracy.

As used herein, the words "geographic location," "location," "geographic position" and "position" refer to a latitude and longitude of an object (or, a latitude, longitude, and elevation of an object) such as the ride share vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Example Overview

Referring to FIG. 1, depicted is an operating environment 100 for a V2X matching system 199 (here, a V2X matching system 199A, a V2X matching system 199B, a V2X matching system 199C and a V2X matching system 199D may be referred to collectively or individually as the "V2X matching system 199" since for example, the V2X matching systems 199A-199D are different instances of the V2X matching system and may provide similar functionality).

The operating environment 100 may include one or more of the following elements: a ride share vehicle 123; a RSU 185; and a user device 110. These elements of the operating environment 100 may be communicatively coupled to a network 105. The RSU 185 may be DSRC-enabled and may relay wireless messages among the ride share vehicle 123 and the user device 110 via the network 105. For example, the range of DSRC transmissions is generally about 500 meters, and so, if the user device 110 is 700 meters away from the ride share vehicle 123, then one or more intervening DSRC-enabled RSUs 185 may relay a DSRC message from the user device 110 to the ride share vehicle 123 or from the ride share vehicle 123 to the user device 110.

Although one ride share vehicle 123, one RSU 185, one user device 110 and one network 105 are depicted in FIG. 1, in practice the operating environment 100 may include one or more ride share vehicles 123, one or more RSUs 185, one or more user devices 110 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, one or more of the ride share vehicle 123, the RSU 185 and the user device 110 may be DSRC-equipped devices. The network 105 may include one or more communication channels shared among the ride share vehicle 123, the user device 110 and the RSU 185. The communication channel may include DSRC, LTE-V2X, full-duplex wireless communication or any other wireless communication protocol. For example, the network 105 may be used to transmit a DSRC message, DSRC probe or BSM including any of the data described herein.

The ride share vehicle 123 may be any type of vehicle. For example, the ride share vehicle 123 may include one of the following types of vehicles: a car; a truck; a sports utility vehicle; a bus; a semi-truck; a drone or any other roadway-based conveyance.

In some embodiments, the ride share vehicle 123 may include an autonomous vehicle or a semi-autonomous vehicle. For example, the ride share vehicle 123 may include an Advanced Driver-Assistance System (ADAS system) 180. The ADAS system 180 may provide some or all of the functionality that provides autonomous functionality.

The ride share vehicle 123 is operated by a driver to provide a ride sharing service to a rider (e.g., a ride share passenger). As depicted in FIG. 1, the driver may carry a user device (e.g., a smartphone), and may interact with a ride share application 198 installed in the user device. The V2X matching system 199A is installed in the ride share vehicle 123. Alternatively, or additionally, the V2X matching system 199B is installed in the user device carried by the driver.

The ride share vehicle 123 may include one or more of the following elements: a processor 125A; a memory 127A; a communication unit 145A; a GPS unit 170; the ADAS system 180; a vehicle sensor set 182; an ECU 186; and the V2X matching system 199A. These elements of the ride share vehicle 123 may be communicatively coupled to one another via a bus.

In some embodiments, the processor 125A and the memory 127A may be elements of an onboard vehicle computer system. The onboard vehicle computer system may be operable to cause or control the operation of the V2X matching system 199A. The onboard vehicle computer system may be operable to access and execute the data stored on the memory 127A to provide the functionality described herein for the V2X matching system 199A.

The processor 125A includes an arithmetic logic unit, a microprocessor, a general-purpose controller, or some other processor array to perform computations and provide electronic display signals to a display device. The processor 125A processes data signals and may include various computing architectures including a complex instruction set computer (CISC) architecture, a reduced instruction set computer (RISC) architecture, or an architecture implementing a combination of instruction sets. The ride share vehicle 123 may include one or more processors 125A. Other processors, operating systems, sensors, displays, and physical configurations may be possible.

The memory 127A stores instructions or data that may be executed by the processor 125A. The instructions or data may include code for performing the techniques described herein. The memory 127A may be a dynamic random-access memory (DRAM) device, a static random-access memory (SRAM) device, flash memory, or some other memory device. In some embodiments, the memory 127A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ride share vehicle 123 may include one or more memories 127A.

The memory 127A of the ride share vehicle 123 may store one or more of: V2X message data 188; vehicle GPS data 189; and rider GPS data 190.

The V2X message data 188 may include digital data describing one or more V2X messages. For example, the V2X message data 188 includes one or more of: (1) digital data describing V2X broadcast messages, V2X unicast messages or a combination thereof received from the user device 110 of the rider; (2) digital data describing V2X broadcast messages, V2X unicast messages or a combination thereof generated by the ride share vehicle 123; and (3) digital data describing one or more V2X broadcast messages, V2X unicast messages or a combination thereof generated by a user device of the driver.

The vehicle GPS data 189 includes digital data describing a geographic location of the ride share vehicle 123 (e.g., DSRC-compliant GPS data). For example, the vehicle GPS data 189 describes a longitude and latitude of the ride share vehicle 123.

In some embodiments, the vehicle GPS data 189 may be retrieved by the GPS unit 170 of the ride share vehicle 123 that is operable to provide GPS data describing the geographic location of the ride share vehicle 123 with lane-level accuracy. For example, the ride share vehicle 123 is traveling in a lane of a roadway. Lane-level accuracy means that the location of the ride share vehicle 123 is described by the GPS data so accurately that the lane of travel of the ride share vehicle 123 within the roadway may be accurately determined based on the GPS data for this ride share vehicle 123 as provided by the GPS unit 170. In some embodiments, the vehicle GPS data 189 is an element of the BSM data or the PSM data.

The rider GPS data 190 includes digital data describing a geographic location of the user device 110 operated by the rider. For example, the rider GPS data 190 describes a longitude and latitude of the user device 110. In some embodiments, the rider GPS data 190 may be retrieved by a GPS unit of the user device 110 and sent to the ride share vehicle 123 via a V2X message.

The communication unit 145A transmits and receives data to and from the network 105 or to another communication channel. In some embodiments, the communication unit 145A may include a DSRC transceiver, a DSRC receiver and other hardware or software necessary to make the ride share vehicle 123 a DSRC-enabled device. For example, the communication unit 145A includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System."

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the communication unit 145A includes any type of V2X communication antenna necessary to support one or more of the following V2X communication protocols: DSRC; mmWave; LTE-V2X; LTE-D2D; 5G-V2X; ITS-G5; ITS-Connect; LPWAN; visible light communication; television white space; Bluetooth; Wi-Fi, etc. The communication unit 145A includes a V2X radio 143. In some embodiments, the V2X matching system 199 includes code and routines that are operable to control the operation of the V2X radio 143 and cause the V2X radio 143 to transmit a V2X message that includes the vehicle GPS data 189 of the ride share vehicle 123.

The V2X radio 143 is an electronic device that includes a V2X transmitter and a V2X receiver and is operable to send and receive wireless messages via any V2X protocol. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio 143 includes multiple channels with at least one of these channels designated for sending and receiving BSMs and at least one of these channels designated for sending and receiving PSMs.

In some embodiments, the GPS unit 170 includes any hardware and software necessary to make the ride share vehicle 123 or the GPS unit 170 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the GPS unit 170 is a DSRC-compliant GPS unit that includes any hardware and software necessary to make the ride share vehicle 123 or the DSRC-compliant GPS unit compliant with one or more of the following DSRC standards, including any derivative or fork thereof: IEEE 802.11; IEEE 1609.x (x=2, 3, 4); SAE J2735; SAE J2945.x (x=0, 1, and others), etc.

In some embodiments, the DSRC-compliant GPS unit is operable to provide GPS data describing the location of the ride share vehicle 123 with lane-level accuracy.

In some embodiments, the DSRC-compliant GPS unit includes hardware that wirelessly communicates with a GPS satellite to retrieve GPS data that describes the geographic location of the ride share vehicle 123 with a precision that is compliant with the DSRC standard. The DSRC standard requires that GPS data be precise enough to infer if two vehicles (one of which is, for example, the ride share vehicle 123) are located in adjacent lanes of travel. In some embodiments, the DSRC-compliant GPS unit is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the V2X matching system 199 described herein may analyze the GPS data provided by the DSRC-compliant GPS unit and determine what lane the ride share vehicle 123 is traveling in based on the relative positions of two or more different vehicles (one of which is, for example, the ride share vehicle 123) traveling on the roadway at the same time.

In some embodiments, the GPS unit 170 is a conventional GPS unit. For example, the GPS unit 170 may include hardware that wirelessly communicates with a GPS satellite to retrieve data that describes a geographic location of the ride share vehicle 123. For example, the GPS unit 170 retrieves the GPS data from one or more GPS satellites.

By comparison to a DSRC-compliant GPS unit, a conventional GPS unit which is not compliant with the DSRC standard is unable to determine the location of a vehicle with lane-level accuracy. For example, a typical roadway lane is approximately 3 meters wide. However, a conventional GPS unit only has an accuracy of plus or minus 10 meters relative to the actual location of the vehicle. As a result, such conventional GPS units are not sufficiently accurate to identify a lane of travel for a vehicle based on GPS data alone; instead, systems having only conventional GPS units must utilize sensors such as cameras to identify the lane of travel of the vehicle. Identifying a lane of travel of a vehicle is beneficial, for example, because in some embodiments it may enable the V2X matching system 199 to more accurately identify a location of the ride share vehicle 123 traveling in a roadway having multiple lanes of travel.

For example, comparing with a GPS unit of a DSRC-equipped vehicle (conformant to SAE J2945/1, with the 1.5-meter accuracy requirement), a GPS unit of a non-DSRC vehicle which is not compliant with the DSRC standard is unable to determine the location of the vehicle with lane-level accuracy. In another example, comparing with a GPS unit of a DSRC-equipped vehicle, a GPS unit of a ride share driver's smart phone is also unable to determine the location of the vehicle with lane-level accuracy.

The ADAS system 180 may include one or more advanced driver assistance systems. Examples of the ADAS system 180 may include one or more of the following elements of the ride share vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the ADAS system 180 includes any hardware or software that controls one or more operations of the ride share vehicle 123 so that the ride share vehicle 123 is "autonomous" or "semi-autonomous."

The vehicle sensor set 182 includes one or more sensors that are operable to measure a roadway environment outside of the ride share vehicle 123. For example, the vehicle sensor set 182 may include one or more sensors that record one or more physical characteristics of the road environment that is proximate to the ride share vehicle 123. The memory 127A may store sensor data that describes the one or more physical characteristics recorded by the vehicle sensor set 182.

In some embodiments, the vehicle sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The ECU 186 is an embedded system in automotive electronics that controls one or more of electrical systems or subsystems in the ride share vehicle 123. Types of the ECU 186 include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the ride share vehicle 123 may include multiple ECUs 186. In some embodiments, the V2X matching system 199 may be an element of the ECU 186.

In some embodiments, the RSU 185 relays V2X communications between the ride share vehicle 123 and the user device 110. The RSU 185 includes an instance of the V2X matching system 199 (e.g., the V2X matching system 199D) for managing the relaying of V2X messages among endpoints (e.g., the user device 110, the ride share vehicle 123, other vehicles or other endpoints) of the operating environment 100. For example, the RSU 185 may receive a V2X message from the ride share vehicle 123, and then the V2X matching system 199 of the RSU 185 causes a processor of the RSU 185 to store the V2X message in a memory of the RSU 185 as part of the V2X message data 188. The V2X matching system 199 of the RSU 185 may relay the V2X message to the user device 110.

The user device 110 is a computing device that includes one or more processors and one or more memories. For example, the user device 110 may be one of the following elements: a smartphone; a laptop computer; a tablet computer; a music player; a video game player; a personal digital assistant (PDA); a portable controller; and any other portable electronic device. Other types of the user device 110 are possible. In some embodiments, the rider may carry the user device 110.

The user device 110 includes one or more of the following elements: a ride share application 198; the V2X matching system 199C; a display 114; a processor 125B; a memory 127B; and a communication unit 145B.

The processor 125B, the memory 127B and the communication unit 145B may have a structure similar to that of the processor 125A, the memory 127B and the communication unit 145A respectively and may provide functionality similar to that of the processor 125A, the memory 127A and the communication unit 145A respectively. Similar description is not repeated here. The processors 125A-125B, the memories 127A-127B and the communication units 145A-145B may be respectively referred to as "processor 125," "memory 127" and "communication unit 145," individually or collectively.

In some embodiments, the ride share application 198 includes software that is operable, when executed by the processor 125, to cause the processor 125 to perform operations for providing a ride sharing service to a rider. For example, the rider may order a ride sharing service via the ride share application 198. The rider may manage (e.g., modify, cancel) the ordered ride sharing service via the ride share application 198. In some embodiments, the V2X matching system 199 is an element of the ride share application 198.

In some embodiments, the display 114 is an electronic display of the user device 110. For example, the display 114 is a liquid crystal display (LCD) or a lighting emitting diode (LED) display. Other types of displays are possible.

In some embodiments, the user device 110 further includes a device sensor set that includes any sensors used to generate sensor data, where the sensor data may enhance the operation or functionality of the V2X matching system 199. For example, the device sensor data may include one or more of: a camera; a GPS sensor; an accelerator; and a gyroscope, etc.

In some embodiments, the V2X matching system 199 includes software that is operable, when executed by the processor 125, to cause the processor 125 to execute one or more steps of methods 300 and 400 and an example process 500 described below with reference to FIGS. 3-5B. For example, the V2X matching system 199 uses V2X message variables to match riders and drivers for a ride sharing service. The V2X matching system 199 does not require the use of a cloud server to match riders and drivers. The V2X matching system 199 uses V2X message variables such as a Received Signal Strength (RSS) to match riders to a closest driver that wants to give a rider a ride. The V2X matching system 199 works with any of the existing ride sharing services, or some other ride sharing service that might be deployed in the future.

In some embodiments, the V2X matching system 199 may be implemented using hardware including a field-programmable gate array ("FPGA") or an application-specific integrated circuit ("ASIC"). In some other embodiments, the V2X matching system 199 may be implemented using a combination of hardware and software. The V2X matching system 199 may be stored in a combination of the devices (e.g., servers or other devices), or in one of the devices.

The V2X matching system 199 is described below in more detail with reference to FIGS. 2-5B.

An example process executed by the V2X matching system 199 is described here. In this example process, assume that both a rider and a driver of the ride share vehicle 123 are carrying smartphones with ride share applications 198 installed in them. The V2X matching system 199 may be a stand-alone application installed on these devices (as well as the ECU of the ride share vehicle 123) or a plug-in of the ride sharing applications 198 on the smartphones and optionally a stand-alone application installed in the ECU of the ride share vehicle 123. The example process may include one or more operations of the following procedures (1)-(7).

Procedure (1): Initially, the V2X matching system 199 of the rider's smartphone causes the smartphone to broadcast a first message. This first message is a V2X message with a request for a ride and may be referred to as "first V2X broadcast message." The information in this first message can be limited in scope in order to protect the rider's privacy. For example, a payload of the first message includes digital data describing only a direction and a distance of the rider's requested route. Because of inherent V2X design, the first message may be received only by drivers within a V2X-communication range of the rider (e.g., 300-500 m).

Procedure (2): A V2X radio of a first driver's smartphone (or the first driver's ride share vehicle 123) which is closest to the rider may receive the first message with a highest Received Signal Strength (RSS).

Procedure (3): The V2X matching system 199 of the first driver's smartphone (or the first driver's ride share vehicle 123) that receives the first message with the highest RSS responds to the ride sharing request. Because the first message is broadcasted, it may be received by many different smartphones of many different drivers within a V2X-communication range. An identity of the first driver's smartphone (or the first driver's ride share vehicle 123) having the highest RSS is determined among the various V2X matching systems 199 installed on the smartphones. For example, in some embodiments, the identity of the smartphone that receives the first message with the highest RSS is determined based on a MAC protocol or some other protocol for determining which smartphone receives the first message with the highest RSS.

Procedure (4): The V2X matching system of the first driver's smartphone (or the first driver's ride share vehicle) may generate a second message. The second message may be a second V2X broadcast message.

In some embodiments, if the ride share vehicle 123 is an autonomous vehicle, the V2X matching system 199 of the first driver's smartphone (or the first driver's ride share vehicle 123) may send the second message to the rider. The second message is broadcasted and received by the smartphone of the rider indicating an intention of the first driver to offer a ride to the rider (including details such as a vehicle make and model, trip fare etc.).

In some embodiments, if the ride share vehicle 123 is not autonomous (e.g., human driven), the V2X matching system 199 of the first driver's smartphone (or the first driver's ride share vehicle 123) may send the second message to the rider. The second message is broadcasted and includes a request for time for the first driver of the ride share vehicle 123 to respond (e.g., a response time of 30 seconds). The V2X matching system 199 of the first driver's smartphone (or the first driver's ride share vehicle 123) may also generate a notification for the first driver of the ride share vehicle 123 to check if the first driver wants to bid for the ride.

Procedure (5): If the first driver decides to bid for the ride, a notification may be sent to the rider (e.g., via a V2X broadcast message); otherwise, a next driver (e.g., a second driver that is second closest to the rider) gets an opportunity to bid for the ride.

Procedure (6): The rider receives bid details from one driver (whether it be the first driver, the second driver, . . . , or an Nth driver) via a V2X message (e.g., via a V2X broadcast message) and may decide whether to accept the ride based on the bid and other details. If the rider accepts a bid, then the V2X matching system 199 of the rider's smartphone broadcasts an accept message that notifies all the drivers that a match has been made and that the ride sharing request of the first message completes. If the rider decides not to accept the bid, then the V2X matching system 199 of the rider's smartphone broadcasts a rejection message that notifies all the drivers that the rider is still looking for a ride and accepting bids from drivers.

Procedure (7): Once a match has been made, the rider and the matched driver may communicate additional details (such as an address of the rider's destination, a current location etc.) using an encrypted V2X broadcast message or a V2X unicast message (e.g., the V2X unicast message may also be encrypted). This procedure preserves the rider's privacy and this information may only be shared with the driver giving the ride.

Example Computer System

Figure 2:
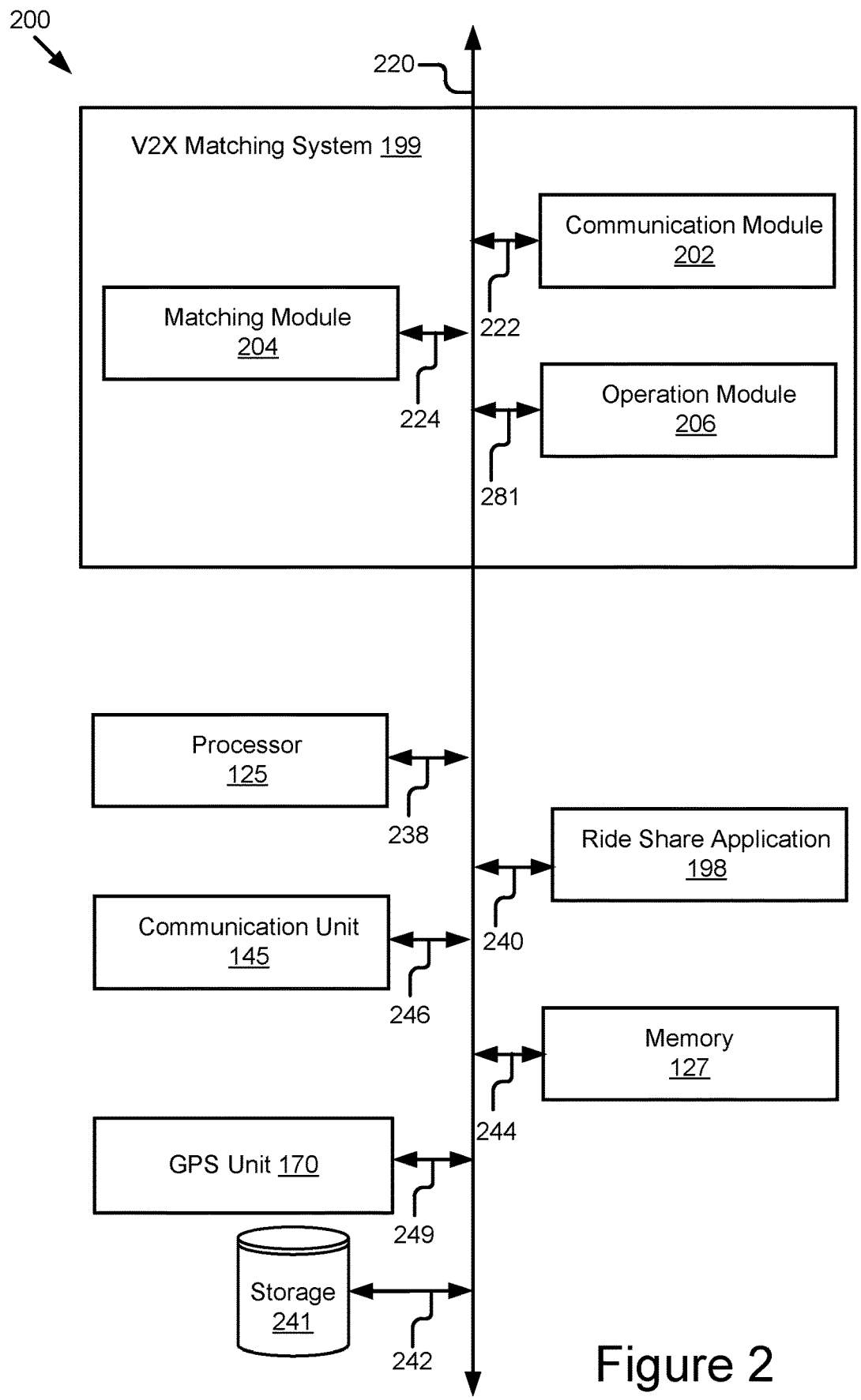
FIG. 2 is a block diagram illustrating an example computer system including a V2X matching system according to some embodiments.

Referring now to FIG. 2, depicted is a block diagram illustrating an example computer system 200 including the V2X matching system 199 according to some embodiments. In some embodiments, the computer system 200 may include a special-purpose computer system that is programmed to perform one or more steps of methods 300 and 400 described below with reference to FIGS. 3-4B and a process 500 described below with reference to FIGS. 5A-5B.

In some embodiments, the computer system 200 may be an element of a first connected device. For example, the first connected device can be the ride share vehicle 123 or a user device of a driver that operates the ride share vehicle 123. The computer system 200 may be an element of the ride share vehicle 123 or an element of the user device of the driver that operates the ride share vehicle 123.

The computer system 200 may include one or more of the following elements according to some examples: the V2X matching system 199; the processor 125; the communication unit 145; the GPS unit 170; the ride share application 198; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The GPS unit 170 is communicatively coupled to the bus 220 via a signal line 249. The ride share application 198 is communicatively coupled to the bus 220 via a signal line 240. The storage 241 is communicatively coupled to the bus 220 via a signal line 242. The memory 127 is communicatively coupled to the bus 220 via a signal line 244.

The following elements of the computer system 200 are described above with reference to FIG. 1, and so, those descriptions will not be repeated here: the processor 125; the communication unit 145; the GPS unit 170; the ride share application 198; and the memory 127.

The memory 127 may store any of the data described above with reference to FIG. 1. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the V2X matching system 199 includes: a communication module 202; a matching module 204; and an operation module 206. These components of the V2X matching system 199 are communicatively coupled to each other via the bus 220. In some embodiments, components of the V2X matching system 199 can be stored in a single server or device. In some other embodiments, components of the V2X matching system 199 can be distributed and stored across multiple servers or devices. For example, some of the components of the V2X matching system 199 may be distributed across the user device 110, the ride share vehicle 123 and a user device operated by the driver of the ride share vehicle 123.

The communication module 202 can be software including routines for handling communications between the V2X matching system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, one or more V2X messages. The communication module 202 may send or receive any of the data or messages described above with reference to FIG. 1 via the communication unit 145.

In some embodiments, the communication module 202 receives data from components of the V2X matching system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the V2X matching system 199. For example, the communication module 202 may handle communications among the matching module 204 and the operation module 206. Any of these modules may cause the communication module 202 to communicate with the other elements of the computer system 200 or the operating environment 100 (via the communication unit 145).

The matching module 204 can be software including routines for executing a ride-share matching process. In some embodiments, the matching module 204 can be stored in the memory 127 of the computer system 200 and can be accessible and executable by the processor 125. The matching module 204 may be adapted for cooperation and communication with the processor 125 and other components of the computer system 200 via a signal line 224.

In the following description of FIG. 2, assume that the computer system 200 is an element of a first connected device operated by a driver. The first connected device receives, via the communication unit 145, a first V2X broadcast message from a second connected device operated by a rider. The first connected device can be a user device of the driver or the ride share vehicle 123 operated by the driver. The second connected device can be the user device 110 operated by the rider.

The first V2X broadcast message includes a request for a ride sharing service. In some embodiments, rather than including an exact location of the second connected device and an exact location of an intended destination of the rider, the first V2X broadcast message includes direction data describing a direction of the intended destination and distance data describing a distance of the intended destination to protect privacy of the rider.

In some embodiments, the first V2X broadcast message is received by multiple connected devices (including the first connected device) within a V2X-communication coverage range of the second connected device. Each of the multiple connected devices determines a V2X-message variable of the first V2X broadcast message, so that multiple V2X-message variables are generated at the multiple connected devices respectively. For example, the matching module 204 of the first connected device determines a first V2X-message variable associated with the first V2X broadcast message. Similarly, a set of other connected devices from the multiple connected devices also determine a set of V2X-message variables associated with the first V2X broadcast message respectively.

The first connected device and the set of other connected vehicles may exchange their V2X-message variables with one another. For example, the matching module 204 of the first connected device receives, from the set of other connected devices, the set of V2X-message variables that are determined at the set of other connected devices respectively.

In some embodiments, the matching module 204 executes a ride-share matching process to match the first connected device with the second connected device based at least in part on the first V2X-message variable so that a delay of the ride-share matching process is minimized. For example, the matching module 204 determines that, compared with the set of other connected devices, the first connected device satisfies a ride-share matching criterion for the second connected device based on the first V2X-message variable and the set of V2X-message variables. Responsive to the first connected device satisfying the ride-share matching criterion for the second connected device, the matching module 204 matches the first connected device with the second connected device.

A ride-share matching criterion includes data describing a condition such that if the first connected device satisfies the condition, the first connected vehicle is determined to be matched with the second connected device. For example, a satisfaction of the ride-share matching criterion by the first connected device indicates one or more of the following: (1) compared with the set of other connected devices, the first connected device has a minimal travel time to the second connected device; (2) compared with the set of other connected devices, the first connected device has a minimal distance to the second connected device; (3) even though the distance between the first connected device and the second connected device is not minimal, the first connected device encounters least traffic to the second connected device so that the first connected device takes least time to get to the rider; and (4) one or more other conditions configured by the rider or other users.

For example, compared with the set of other connected devices, the first connected device has a minimal travel time to the second connected device so that the first connected device satisfies the ride-share matching criterion for the second connected device. In another example, compared with the set of other connected devices, the first connected device has a minimal distance to the second connected device so that the first connected device satisfies the ride-share matching criterion for the second connected device.

In some embodiments, a distance between the first connected device and the second connected device can be evaluated in terms of a received signal strength of the first V2X broadcast message that is measured at the first connected device. Similarly, distances between the second connected device and the set of other connected devices can also be evaluated in terms of received signal strengths of the first V2X broadcast message that are measured at the set of other connected devices respectively.

For example, the first V2X-message variable includes a first received signal strength of the first V2X broadcast message that is determined at the first connected device. The set of V2X-message variables received from the set of other connected vehicles includes a set of received signal strengths of the first V2X broadcast message that are determined at the set of other connected devices respectively. The first received signal strength at the first connected device has a maximal value compared with the set of received signal strengths at the set of other connected devices, so that the first connected device has the minimal distance to the second connected device.

In some embodiments, responsive to matching the first connected device with the second connected device, the matching module 204 transmits, via the communication unit 145, a second V2X broadcast message that responds to the request for the ride sharing service.

For example, the second V2X broadcast message indicates an intention of the first connected device to offer the ride to the rider that operates on the second connected device. In this case, the ride share vehicle 123 can be an autonomous vehicle, and a driver may or may not be present in the vehicle. The second V2X broadcast message includes a trip fare and a make and a model of the ride share vehicle 123 that offers the ride to the rider.

In another example, the ride share vehicle is not autonomous (e.g., is human driven), and the second V2X broadcast message includes an allocated response time for the driver of the first connected vehicle to take action to accept or reject a bid for the ride. The matching module 204 generates a notification to prompt the driver of the first connected device to accept or reject the bid for the ride within the allocated response time.

Responsive to receiving an input from the driver of the first connected device indicating that the driver accepts the bid for the ride, the matching module 204 transmits a third V2X broadcast message indicating that the driver of the first connected device accepts the bid for the ride. In some embodiments, the second V2X broadcast message may also include data indicating that the driver of the first connected device accepts the bid for the ride. In this case, the transmission of the third V2X broadcast message is not needed.

Responsive to receiving an input from the driver of the first connected device indicating that the driver rejects the bid for the ride, the matching module 204 may or may not transmit the third V2X broadcast message indicating that the driver of the first connected device rejects the bid for the ride. In some embodiments, the first connected device may not transmit the second V2X broadcast message if the driver of the first connected device rejects the bid for the ride. Instead, a second driver that is second closest to the rider may have an opportunity to bid for the ride. If the second driver accepts the bid, a third connected device operated by the second driver may generate and transmit the second V2X broadcast message indicating that the second driver accepts the bid for the ride. In this case, the V2X matching system 199 of the first connected device may not take any further actions.

Without loss of generality, in the following, assume that the driver of the first connected device accepts the bid for the ride. The second connected device receives the second V2X broadcast message (as well as the third V2X broadcast message if there is any) including bid details from the first connected device and decides whether to accept the ride based on the bid and other details. If the rider accepts the bid, then the V2X matching system 199 of the second connected device transmits a fourth V2X broadcast message. In this case, the fourth V2X broadcast message is an accept message that notifies all the drivers that a match has been made and that the ride sharing request of the first V2X broadcast message completes. However, if the rider decides not to accept the bid, then the V2X matching system 199 of the second connected device transmits the fourth V2X broadcast message, which in this case is a rejection message that notifies all the drivers that the rider is still looking for a ride and accepting bids from drivers.

Then, the matching module 204 of the first connected device receives, via the communication unit 145, the fourth V2X broadcast message from the second connected device. If the fourth V2X broadcast message is an accept message (indicating that the rider accepts the offer for the ride provided by the first connected device), then the ride-share matching process completes, and the first connected device is successfully matched to the second connected device. If the fourth V2X broadcast message is a rejection message (indicating that the rider rejects the offer for the ride provided by the first connected device), then the ride-share matching process executed by the first connected device may terminate. A new ride-share matching process may be executed by any other connected device within a V2X-communication range of the second connected device (e.g., a bid for the ride may be provided to a second driver that is second closest to the rider to match the rider with the second driver, etc.).

The operation module 206 can be software including routines for modifying an operation of the communication unit 145 to establish a secure communication between the first connected device and the second connected device. In some embodiments, the operation module 206 can be stored in the memory 127 of the computer system 200 and can be accessible and executable by the processor 125. The operation module 206 may be adapted for cooperation and communication with the processor 125 and other components of the computer system 200 via a signal line 281.

In some embodiments, responsive to a completion of the ride-share matching process (e.g., the first connected device is successfully matched to the second connected device), the operation module 206 modifies an operation of the communication unit 145 to establish a secure communication between the first connected device and the second connected device for exchanging ride share information for the ride sharing service. The secure communication may protect both the rider's and the driver's privacy.

For example, the operation module 206 modifies the communication unit 145 to operate in a secure mode so that (1) a first set of V2X messages that are intended to transmit to the second connected device are encrypted at the communication unit 145 of the first connected device before transmission and (2) a second set of V2X messages that are received from the second connected device are decrypted at the communication unit 145. In this case, the ride share information exchanged between the first connected device and the second connected device is protected by encryption. In some embodiments, a public-key cryptography technique or a secret-key cryptography technique may be used to encrypt and decrypt the information.

In another example, the operation module 206 applies a directional beamforming technique on the communication unit 145 so that the transmission power of the communication unit 145 is concentrated on a direction of the second connected device so that other unrelated connected devices in other directions cannot receive signals transmitted by the first connected device with sufficient power. In this case, since signal-to-noise ratios at the other unrelated connected devices are low, the other unrelated connected devices may not be able to identify the transmitted information from the received signals.

The ride share information being exchanged includes, for example, one or more of: a phone number of the rider; a phone number of the driver; a location of an intended destination; a location of the second connected device; a location of the first connected device; a travel route from the first connected device to the second connected device; and an estimated travel time from the first connected device to the second connected device, etc.

Example Processes

Figure 3:
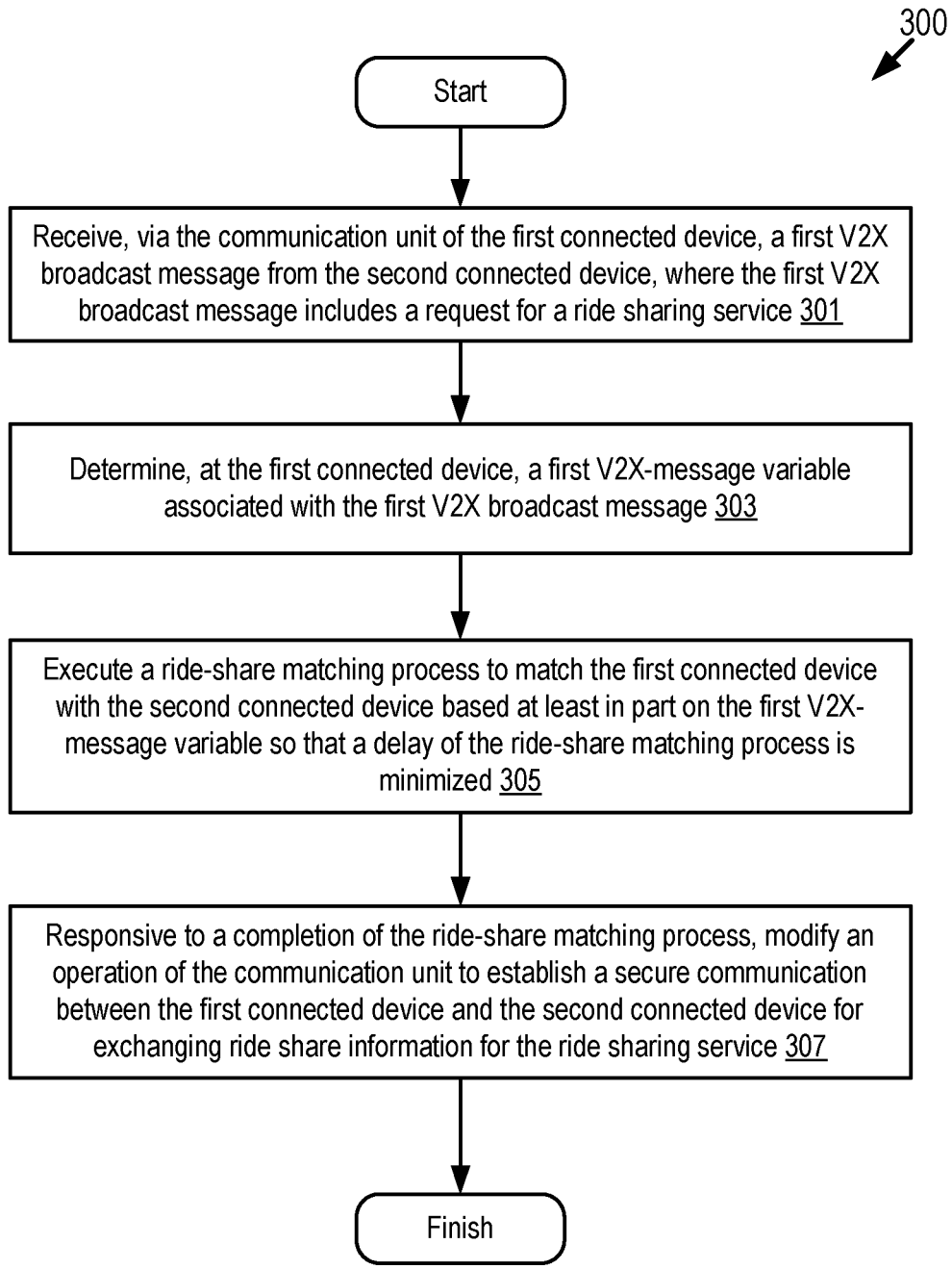
FIG. 3 depicts a method for matching a rider to a driver for a ride sharing service based on a V2X message variable according to some embodiments.

Referring now to FIG. 3, depicted is a flowchart of an example method 300 for matching a rider to a driver for a ride sharing service based on a V2X message variable according to some embodiments. The steps of the method 300 are executable in any order, and not necessarily the order depicted in FIG. 3. The method 300 is performed by the V2X matching system 199 of a first connected device.

At step 301, the matching module 204 receives, via the communication unit 145 of the first connected device, a first V2X broadcast message from a second connected device, where the first V2X broadcast message includes a request for a ride sharing service.

At step 303, the matching module 204 determines, at the first connected device, a first V2X-message variable associated with the first V2X broadcast message.

At step 305, the matching module 204 executes a ride-share matching process to match the first connected device with the second connected device based at least in part on the first V2X-message variable so that a delay of the ride-share matching process is minimized.

At step 307, responsive to a completion of the ride-share matching process, the operation module 206 modifies an operation of the communication unit 145 to establish a secure communication between the first connected device and the second connected device for exchanging ride share information for the ride sharing service.

Figure 4A:
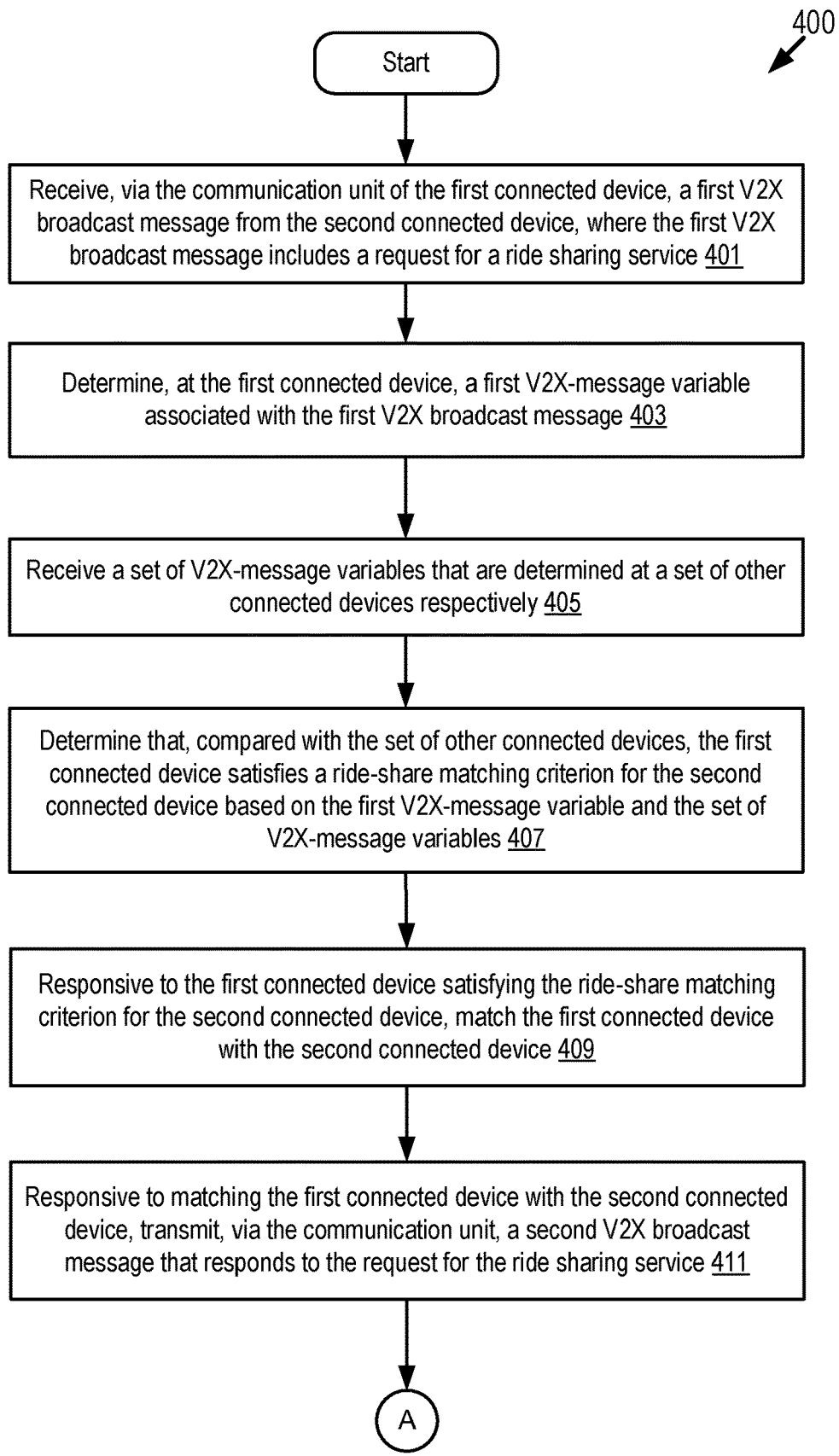
FIGS. 4A-4B depict another method for matching a rider to a driver for a ride sharing service based on a V2X message variable according to some embodiments.
Figure 4B:
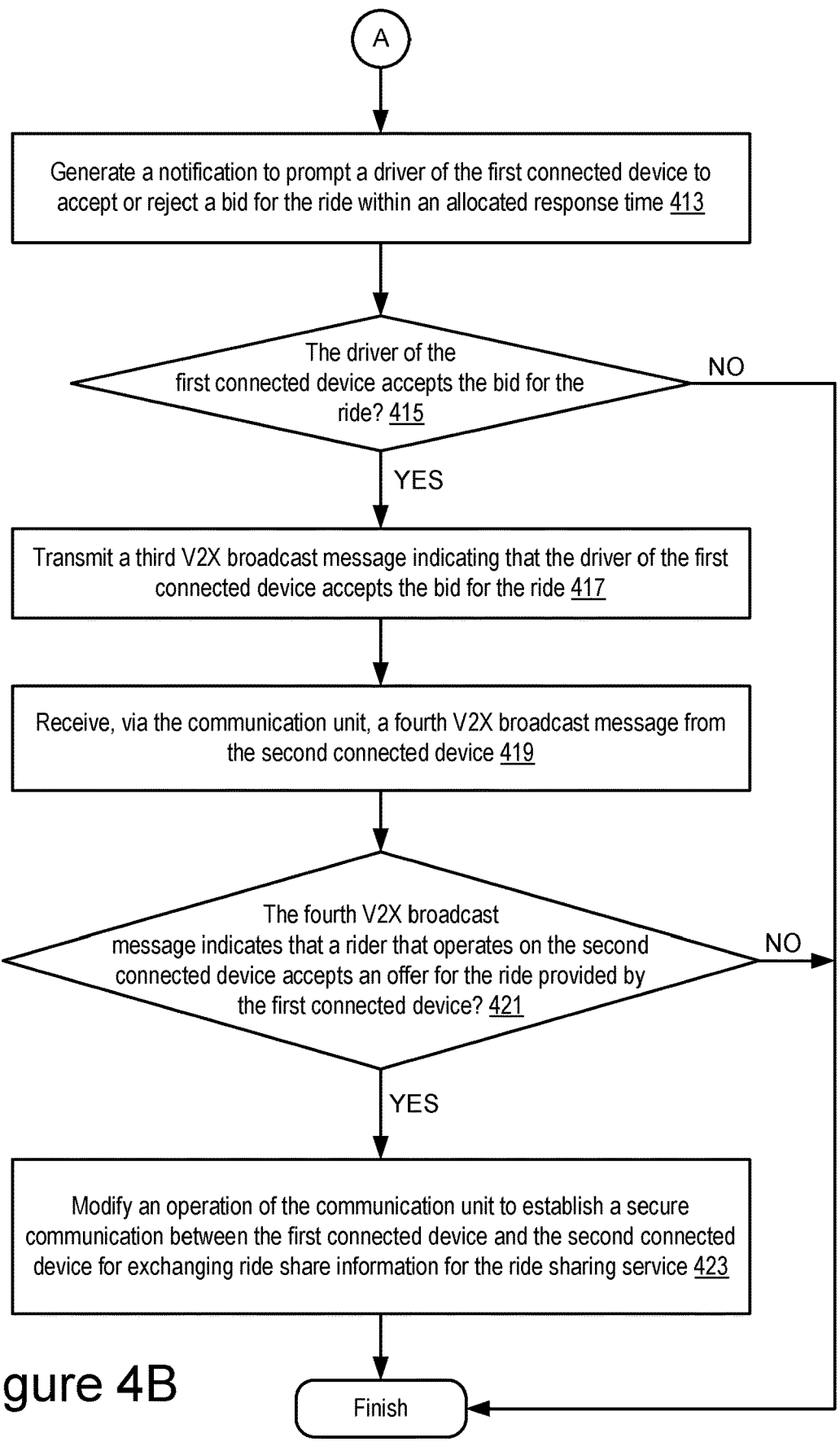

FIGS. 4A-4B depict another method 400 for matching a rider to a driver for a ride sharing service based on a V2X message variable according to some embodiments. The steps of the method 400 are executable in any order, and not necessarily the order depicted in FIGS. 4A-4B. The method 400 is performed by the V2X matching system 199 of a first connected device.

Referring to FIG. 4A, at step 401, the matching module 204 receives, via the communication unit 145 of the first connected device, a first V2X broadcast message from the second connected device, where the first V2X broadcast message includes a request for a ride sharing service.

At step 403, the matching module 204 determines, at the first connected device, a first V2X-message variable associated with the first V2X broadcast message.

At step 405, the matching module 204 receives a set of V2X-message variables associated with the first V2X broadcast message that are determined at a set of other connected devices respectively.

At step 407, the matching module 204 determines that, compared with the set of other connected devices, the first connected device satisfies a ride-share matching criterion for the second connected device based on the first V2X-message variable and the set of V2X-message variables.

At step 409, responsive to the first connected device satisfying the ride-share matching criterion for the second connected device, the matching module 204 matches the first connected device with the second connected device.

At step 411, responsive to matching the first connected device with the second connected device, the matching module 204 transmits, via the communication unit 145, a second V2X broadcast message that responds to the request for the ride sharing service.

Referring to FIG. 4B, at step 413, the matching module 204 generates a notification to prompt a driver of the first connected device to accept or reject a bid for the ride within an allocated response time.

At step 415, the matching module 204 determines whether the driver of the first connected device accepts the bid for the ride. If the driver accepts the bid for the ride, the method 400 moves to step 417. Otherwise, the method 400 ends.

At step 417, the matching module 204 transmits a third V2X broadcast message indicating that the driver of the first connected device accepts the bid for the ride.

At step 419, the matching module 204 receives, via the communication unit 145, a fourth V2X broadcast message from the second connected device.

At step 421, the matching module 204 determines whether the fourth V2X broadcast message indicates that a rider that operates on the second connected device accepts an offer for the ride provided by the first connected device. If the rider accepts the offer for the ride, the method 400 moves to step 423. Otherwise, the method 400 ends.

At step 423, the operation module 206 modifies an operation of the communication unit 145 to establish a secure communication between the first connected device and the second connected device for exchanging ride share information for the ride sharing service.

Figure 5A:
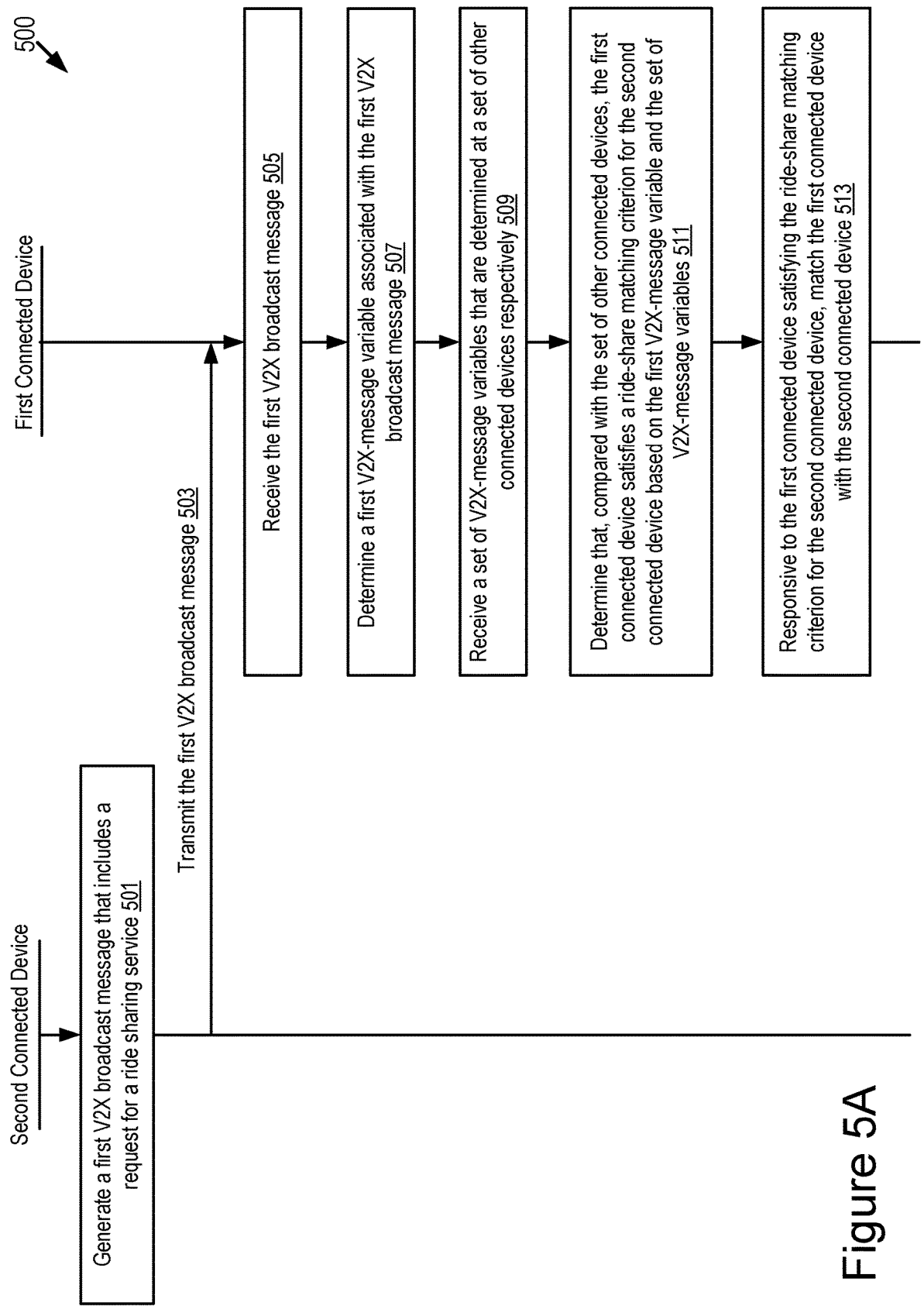
FIGS. 5A-5B depict an example process for matching a rider to a driver for a ride sharing service based on a V2X message variable according to some embodiments.
Figure 5B:
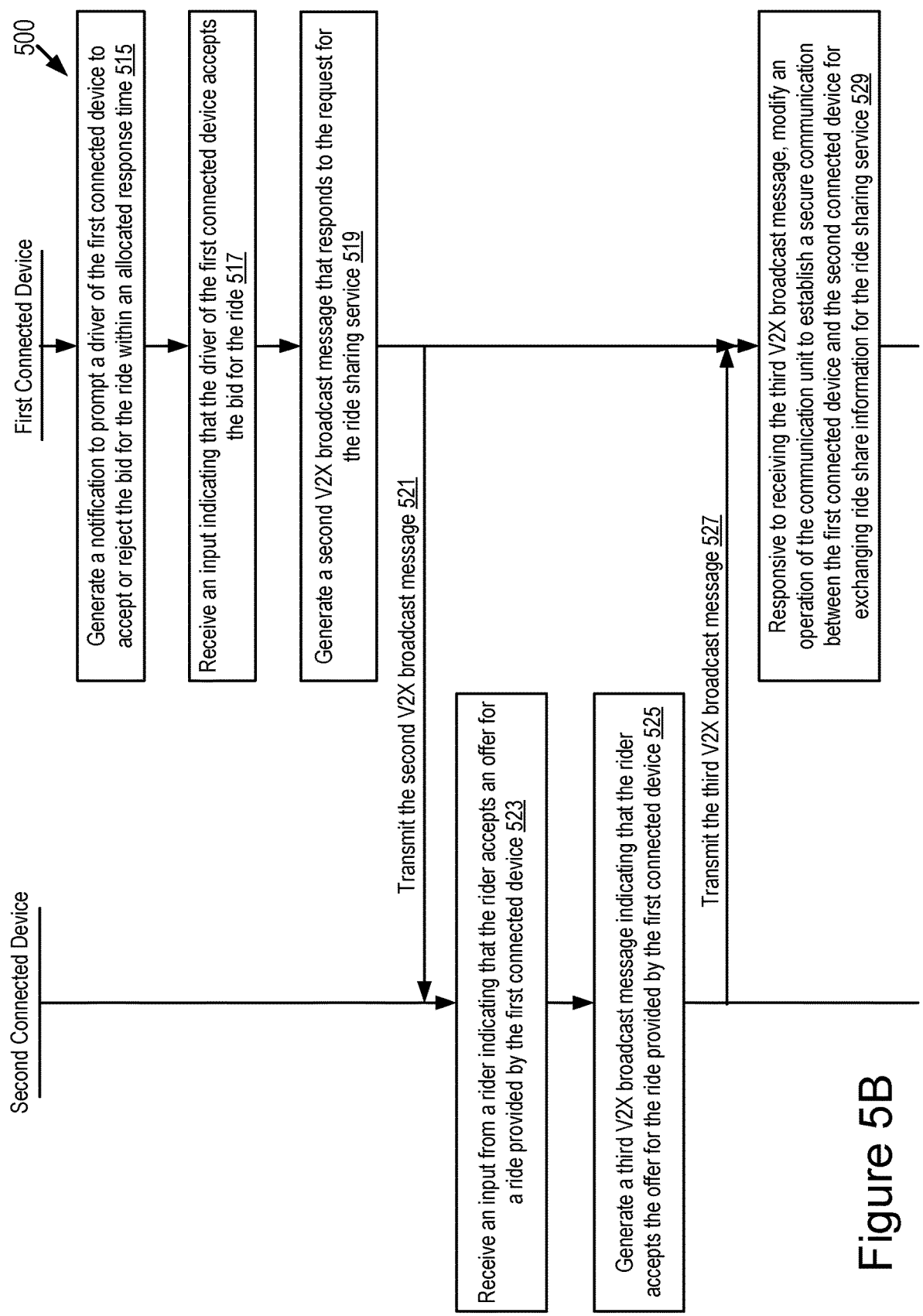

FIGS. 5A-5B depicts an example process 500 for matching a rider associated with a second connected device to a driver associated with a first connected device for a ride sharing service based on a V2X message variable according to some embodiments. The steps of the process 500 are executable in any order, and not necessarily the order depicted in FIGS. 5A-5B.

Referring to FIG. 5A, at step 501, the V2X matching system 199 of the second connected device generates a first V2X broadcast message that includes a request for a ride sharing service.

At step 503, the V2X matching system 199 of the second connected device transmits the first V2X broadcast message.

At step 505, the V2X matching system 199 of the first connected device receives, via the communication unit 145 of the first connected device, the first V2X broadcast message from the second connected device.

At step 507, the V2X matching system 199 of the first connected device determines, at the first connected device, a first V2X-message variable associated with the first V2X broadcast message.

At step 509, the V2X matching system 199 of the first connected device receives a set of V2X-message variables associated with the first V2X broadcast message that are determined at a set of other connected devices respectively.

At step 511, the V2X matching system 199 of the first connected device determines that, compared with the set of other connected devices, the first connected device satisfies a ride-share matching criterion for the second connected device based on the first V2X-message variable and the set of V2X-message variables.

At step 513, responsive to the first connected device satisfying the ride-share matching criterion for the second connected device, the V2X matching system 199 of the first connected device matches the first connected device with the second connected device.

Referring to FIG. 5B, at step 515, the V2X matching system 199 of the first connected device generates a notification to prompt a driver of the first connected device to accept or reject the bid for the ride within an allocated response time.

At step 517, the V2X matching system 199 of the first connected device receives an input indicating that the driver of the first connected device accepts the bid for the ride.

At step 519, the V2X matching system 199 of the first connected device generates a second V2X broadcast message that responds to the request for the ride sharing service. For example, the second V2X broadcast message includes data indicating that the driver of the first connected device accepts the bid for the ride.

At step 521, the V2X matching system 199 of the first connected device transmits, via the communication unit 145, the second V2X broadcast message.

At step 523, the V2X matching system 199 of the second connected device receives an input from a rider indicating that the rider accepts an offer for a ride provided by the first connected device.

At step 525, the V2X matching system 199 of the second connected device generates a third V2X broadcast message indicating that the rider accepts the offer for the ride provided by the first connected device.

At step 527, the V2X matching system 199 of the second connected device transmits the third V2X broadcast message.

At step 529, responsive to receiving the third V2X broadcast message indicating that the rider accepts the offer for the ride provided by the first connected device, the V2X matching system 199 of the first connected device modifies an operation of the communication unit 145 to establish a secure communication between the first connected device and the second connected device for exchanging ride share information for the ride sharing service.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a first connected device, comprising:
   receiving, via a communication unit of the first device, a first Vehicle-to-Everything (V2X) broadcast message from a second device, wherein the first V2X broadcast message includes a request for a ride sharing service;
   receiving a set of V2X-message variables that are determined at a set of other devices, respectively;
   executing a ride-share matching process to match the first device with the second device by:
      determining that, compared with the set of other devices, the first device satisfies a ride-share matching criterion for the second device based on the set of V2X-message variables and a first V2X-message variable associated with the first V2X broadcast message; and
      responsive to the first device satisfying the ride-share matching criterion for the second device, matching the first device with the second device; and
   responsive to a completion of the ride-share matching process, modifying an operation of the communication unit to establish a secure communication between the first device and the second device.

2. The method of claim 1, further comprising determining, at the first device, a first V2X message variable associated with the first V2X broadcast message, wherein:
 executing the ride-share matching process is based on the first V2X message variable so that a delay of the ride-share matching process is minimized.

3. The method of claim 1, wherein compared with the set of other connected devices, the first device has a minimal travel time to the second device so that the first device satisfies the ride-share matching criterion for the second device.

4. The method of claim 1, wherein compared with the set of other devices, the first device has a minimal distance to the second device so that the first device satisfies the ride-share matching criterion for the second device.

5. The method of claim 4, wherein:
 the first V2X-message variable includes a first received signal strength of the first V2X broadcast message that is determined at the first device;
 the set of V2X-message variables includes a set of received signal strengths of the first V2X broadcast message that are determined at the set of other devices respectively; and
 the first received signal strength at the first device has a maximal value compared with the set of received signal strengths at the set of other devices, so that the first device has the minimal distance to the second device.

6. The method of claim 2, wherein executing the ride-share matching process to match the first device with the second device further comprises:
 responsive to matching the first device with the second device, transmitting, via the communication unit, a second V2X broadcast message that responds to the request for the ride sharing service; and
 receiving, via the communication unit, a third V2X broadcast message that indicates that a rider that operates on the second device accepts an offer for a ride provided by the first device so that the ride-share matching process completes.

7. The method of claim 6, wherein the second V2X broadcast message indicates an intention of the first device to offer the ride to the rider that operates on the second device.

8. The method of claim 6, wherein the second V2X broadcast message includes a trip fare and a make and a model of a vehicle that offers the ride to the rider that operates on the second device.

9. The method of claim 6, wherein the second V2X broadcast message includes an allocated response time for a driver of the first device to take action to accept or reject a bid for the ride.

10. The method of claim 9, wherein prior to receiving the third V2X broadcast message, executing the ride-share matching process to match the first device with the second device further comprises:
 generating a notification to prompt the driver of the first device to accept or reject the bid for the ride within the allocated response time; and
 responsive to receiving an input indicating that the driver of the first device accepts the bid for the ride, transmitting a fourth V2X broadcast message indicating that the driver of the first device accepts the bid for the ride.

11. The method of claim 1, wherein the first V2X broadcast message includes direction data describing a direction of an intended destination of the second device and distance data describing a distance of the intended destination.

12. The method of claim 1, wherein the first V2X broadcast message is received by a plurality of connected devices within a V2X-communication coverage range of the second device and the plurality of connected devices includes the first device.

13. The method of claim 1, wherein modifying the operation of the communication unit to establish the secure communication between the first device and the second device comprises:
 modifying the communication unit to operate in a secure mode so that one or more first V2X messages that are intended to transmit to the second device are encrypted at the communication unit before transmission and one or more second V2X messages that are received from the second device are decrypted at the communication unit.

14. The method of claim 1, wherein the ride share information being exchanged includes one or more of: a phone number associated with the first device; a phone number associated with the second device; a location of an intended destination; a location of the second device; a location of the first device; a travel route from the first device to the second device; and an estimated travel time from the first device to the second device.

15. A system for a first device, comprising:
 a processor; and
 a non-transitory memory storing computer code which, when executed by the processor, causes the processor to:
  receive, via a communication unit of the first device, a first Vehicle-to-Everything (V2X) broadcast message from a second device, wherein the first V2X broadcast message includes a request for a ride sharing service;
  receive a set of V2X-mes sage variables that are determined at a set of other devices, respectively;
  execute a ride-share matching process to match the first device with the second device by:
   determining that, compared with the set of other devices, the first device satisfies a ride-share matching criterion for the second device based on the set of V2X-message variables and a first V2X-message variable associated with the first V2X broadcast message; and
   responsive to the first device satisfying the ride-share matching criterion for the second device, matching the first device with the second device; and
  responsive to a completion of the ride-share matching process, modify an operation of the communication unit to establish a secure communication between the first device and the second device for exchanging ride share information for the ride sharing service.

16. The system of claim 15, wherein the computer code, when executed by the processor, causes the processor to determine, at the first device, a first V2X message variable associated with the first V2X broadcast message, wherein:
 executing the ride-share matching process is based on the first V2X message variable so that a delay of the ride-share matching process is minimized.

17. The system of claim 15, wherein compared with the set of other devices, the first device has a minimal travel time to the second device so that the first device satisfies the ride-share matching criterion for the second device.

18. The system of claim 15, wherein compared with the set of other devices, the first device has a minimal distance to the second device so that the first device satisfies the ride-share matching criterion for the second device.

19. A computer program product comprising a non-transitory memory storing computer-executable code that, when executed by a processor, causes the processor to:
- receive, via a communication unit of a first device, a first Vehicle-to-Everything (V2X) broadcast message from a second device, wherein the first V2X broadcast message includes a request for a ride sharing service;
- receive a set of V2X-message variables that are determined at a set of other devices, respectively;
- execute a ride-share matching process to match the first device with the second device by:
  - determining that, compared with the set of other devices, the first device satisfies a ride-share matching criterion for the second device based on the set of V2X-message variables and a first V2X-message variable associated with the first V2X broadcast message; and
  - responsive to the first device satisfying the ride-share matching criterion for the second device, matching the first device with the second device; and
- responsive to a completion of the ride-share matching process, modify an operation of the communication unit to establish a secure communication between the first device and the second device for exchanging ride share information for the ride sharing service.

20. The computer program product of claim 19, wherein the computer-executable code that, when executed by the processor, causes the processor to determining, at the first device, a first V2X message variable associated with the first V2X broadcast message, wherein:
- executing the ride-share matching process is based on the first V2X message variable so that a delay of the ride-share matching process is minimized.

* * * * *